United States Patent
Yu et al.

(10) Patent No.: US 9,232,512 B2
(45) Date of Patent: Jan. 5, 2016

(54) RESOURCE ASSIGNMENTS FOR RELAY SYSTEM AND METHOD

(75) Inventors: Yi Yu, Irving, TX (US); Zhijun Cai, Euless, TX (US); James Earl Womack, Bedford, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 124 days.

(21) Appl. No.: 12/722,417

(22) Filed: Mar. 11, 2010

(65) Prior Publication Data

US 2010/0232347 A1 Sep. 16, 2010

Related U.S. Application Data

(60) Provisional application No. 61/160,163, filed on Mar. 13, 2009, provisional application No. 61/160,156, filed on Mar. 13, 2009, provisional application No. 61/160,158, filed on Mar. 13, 2009.

(51) Int. Cl.
*H04W 72/04* (2009.01)
*H04B 7/26* (2006.01)
*H04W 84/04* (2009.01)
*H04W 88/04* (2009.01)
*H04L 5/00* (2006.01)

(52) U.S. Cl.
CPC ........... *H04W 72/042* (2013.01); *H04L 5/0053* (2013.01); *H04B 7/2606* (2013.01); *H04L 5/005* (2013.01); *H04W 84/047* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 2007/0147326 A1 | 6/2007 | Chen | |
| 2008/0095038 A1 | 4/2008 | Chang et al. | |
| 2008/0107091 A1 | 5/2008 | Ramachandran | |
| 2008/0310356 A1* | 12/2008 | Cai et al. | 370/329 |
| 2009/0034458 A1* | 2/2009 | Horn et al. | 370/329 |
| 2009/0203383 A1* | 8/2009 | Shen et al. | 455/450 |
| 2009/0207794 A1* | 8/2009 | Meylan | 370/329 |
| 2010/0074209 A1* | 3/2010 | Montojo et al. | 370/329 |
| 2010/0080187 A1 | 4/2010 | Papasakellariou et al. | |
| 2010/0115355 A1* | 5/2010 | Hsu | 714/726 |
| 2010/0120442 A1 | 5/2010 | Zhuang et al. | |
| 2010/0157927 A1 | 6/2010 | Mochizuki et al. | |
| 2010/0182939 A1* | 7/2010 | Ojala et al. | 370/280 |
| 2010/0195629 A1* | 8/2010 | Chen et al. | 370/336 |
| 2010/0290411 A1* | 11/2010 | Kim et al. | 370/329 |

(Continued)

FOREIGN PATENT DOCUMENTS

CN 1852190 A 10/2006
CN 101072065 A 11/2007

(Continued)

OTHER PUBLICATIONS

PCT International Search Report; PCT Application No. PCT/US2010/027042; mailed Jul. 26, 2010; 3 pgs.

(Continued)

*Primary Examiner* — Mohammad Adhami
(74) *Attorney, Agent, or Firm* — Conley Rose, P.C.; J. Robert Brown, Jr.

(57) ABSTRACT

A method for allocating uplink resources to a relay node. The method includes an access node allocating a plurality of disparate uplink resources to the relay node in a single downlink transmission to the relay node.

21 Claims, 4 Drawing Sheets

(56) References Cited

U.S. PATENT DOCUMENTS

| | | | |
|---|---|---|---|
| 2011/0096717 A1 | 4/2011 | Kim et al. | |
| 2011/0122825 A1* | 5/2011 | Lee et al. | 370/328 |
| 2011/0164584 A1 | 7/2011 | Seo et al. | |
| 2011/0194412 A1 | 8/2011 | Park et al. | |
| 2011/0194485 A1 | 8/2011 | Horneman et al. | |
| 2011/0194523 A1 | 8/2011 | Chung et al. | |
| 2011/0222428 A1 | 9/2011 | Charbit et al. | |
| 2011/0223927 A1* | 9/2011 | Seo et al. | 455/450 |
| 2011/0250897 A1 | 10/2011 | Seo et al. | |
| 2011/0268053 A1 | 11/2011 | Che et al. | |
| 2012/0039239 A1* | 2/2012 | Park et al. | 370/315 |
| 2012/0039263 A1* | 2/2012 | Moberg et al. | 370/329 |
| 2012/0172044 A1* | 7/2012 | Wu | 455/436 |
| 2013/0148551 A1 | 6/2013 | Lindh et al. | |
| 2013/0182679 A1* | 7/2013 | Seo et al. | 370/330 |

FOREIGN PATENT DOCUMENTS

| | | |
|---|---|---|
| CN | 101146337 A | 3/2008 |
| EP | 1804430 A1 | 7/2007 |
| EP | 1804442 A1 | 7/2007 |
| EP | 1890445 A2 | 2/2008 |
| EP | 1919135 A2 | 5/2008 |
| EP | 1936828 A2 | 6/2008 |
| EP | 1940189 A2 | 7/2008 |
| EP | 1995980 A1 | 11/2008 |
| EP | 2020780 A1 | 2/2009 |
| JP | 2008104195 A | 5/2008 |
| JP | 2012503922 A | 2/2012 |
| KR | 20080089488 A | 10/2008 |
| WO | 2007133022 A1 | 11/2007 |
| WO | 2007148583 A1 | 12/2007 |
| WO | 2008020164 A1 | 2/2008 |
| WO | 2008036784 A2 | 3/2008 |
| WO | 2008057388 A1 | 5/2008 |
| WO | 2008103965 A1 | 8/2008 |
| WO | 2008125905 A2 | 10/2008 |
| WO | 2008133416 A1 | 11/2008 |
| WO | 2009001594 A1 | 12/2008 |
| WO | 2009018515 A1 | 2/2009 |
| WO | 2010077038 A2 | 7/2010 |

OTHER PUBLICATIONS

PCT Written Opinion of the International Searching Authority; PCT Application No. PCT/US2010/027042; mailed Jul. 26, 2010; 2 pgs.
PCT International Search Report; PCT Application No. PCT/US2010/027044; mailed Aug. 4, 2010; 3 pgs.
PCT Written Opinion of the International Searching Authority; PCT Application No. PCT/US2010/027044; mailed Aug. 4, 2010; 2 pgs.
PCT International Search Report; PCT Application No. PCT/US2010/027045; mailed Aug. 3, 2010; 4 pgs.
PCT Written Opinion of the International Searching Authority; PCT Application No. PCT/US2010/027045; mailed Aug. 3, 2010; 5 pgs.
PCT Written Opinion of the International Preliminary Examing Authority; PCT Application No. PCT/US2010/027042; mailed Mar. 21, 2011; 5 pgs.
PCT Written Opinion of the International Preliminary Examing Authority; PCT Application No. PCT/US2010/027044; mailed Mar. 21; 5 pgs.
PCT Written Opinion of the International Preliminary Examinig Authority; PCT Application No. PCT/US2010/027045; mailed Mar. 21, 2011; 7 pgs.
PCT International Preliminary Report on Patentability; PCT Application No. PCT/US2010/027042; mailed Jun. 16, 2011, 6 pgs.
PCT International Preliminary Report on Patentability; PCT Application No. PCT/US2010/027045; mailed Jun. 16, 2011, 14 pgs.
PCT International Preliminary Report on Patentability; PCT Application No. PCT/US2010/027044; mailed Jun. 20, 2011; 6 pgs.
3GPP TS 36.304 v8.4.0; 3rd Generation Partnership Project; Technical Specification Group Radio Access Network; Evolved Universal Terrestrial Radio Access (E-UTRA); User Equipment (UE) Procedures in Idle Mode; Release 8; Dec. 2008; 29 pgs.
3GPP TS 36.331 v8.4.0; 3rd Generation Partnership Project; Technical Specification Group Radio Access Network; Evolved Universal Terrestrial Radio Access (E-UTRA) Radio Resource Control (RRC); Protocol Specification; Release 8; Dec. 2008; 198 pgs.
3GPP TR 36.814 v0.4.1; 3rd Generation Partnership Project; Technical Specification Group Radio Access Network; Further Advancements for E-UTRA Physical Layer Aspects; Release 9; Feb. 2009; 31 pgs.
3GPP TR 36.913 v1.0.0; 3rd Generation Partnership Project; Technical Specification Group Radio Access Network; Requirements for Further Advancements for E-UTRA (LTE-Advanced) Release 8; May 2008; 13 pgs.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 117 pgs.; Part 1.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 101 pgs.; Part 2.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 96 pgs.; Part 3.
Texas Instruments; 3GPP TSG RAN WG1 #54bis; Title: Decode and Forward Relays for E-UTRA Enhancements; R1-083533; Prague, Czech Republic; Sep. 29-Oct. 3, 2008; 5 pgs.
Panasonic; 3GPP TSG RAN WG1 Meeting #54bis; Title: Discussion on the TD Relay and FD Relay for FDD System; R1-083676; Prague, Czech Republic; Sep. 29-Oct. 3, 2008; 5 pgs.
Ericsson; TSG-RAN WG1 #53; Title: A Discussion on Some Technology Components for LTE-Advanced; R1-082024; Kansas City, Missiouri; May 5-9, 2008; 11 pgs.
China Mobile, Vodafone, Huawei; TSG-RAN WG1 #54; Title: Application Scenarios for LTE-Advanced Relay; R1-082975; Jeju, Korea; Aug. 18-22, 2008; 7 pgs.
Samsung; 3GPP TSG RAN WG1 Meeting #53bis; Title: Application of Network Coding in LTE-Advanced Relay; R1-082327; Warsaw, Poland; Jun. 30-Jul. 4, 2008; 4 pgs.
Qualcomm Europe; 3GPP TSG-RAN WG1 #54; Title: Operation of Relays in LTE-A; R1-083191; Jeju, S. Korea; Aug. 18-22, 2008; 5 pgs.
Motorola; TSG-RAN WG1 #54; Title: Classification of Relays; R1-083223; Jeju, South Korea; Aug. 18-22, 2008; 3 pgs.
Mitsubishi Electric; 3GPP TSG RAN WG1 #54 Meeting; Title: Basic Structure of Relaying under Multi-Antenna eNB; R1-082775; Jeju Island, Korea; Aug. 18-22, 2008; 4 pgs.
TSG-RAN WG1; 3GPP TSG RAN WG1 Meeting #55; Title: LS on Forward Compatibility Support in Rel-8; R1-084538; Prague, Czech Rep.; Nov. 10-14, 2008; 1 pg.
ZTE; TSG-RAN WG1 #56; Title: Control Signaling Structures for Relay Link; R1-090641; Athens, Greece; Feb. 9-13, 2009; 3 pgs.
Nortel; 3GPP TSG-RAN Working Group 1 Meeting #56; Title: Control Channel and Data Channel Design for Relay Link in LTE-Advanced; R1-090753; Athens, Greece; Feb. 9-13, 2009; 9 pgs.
RIML Internal Search Report; Title: Relay Research Overview; Authors: Sam Cai, Jim Womack, and Yi Yu; Oct. 26, 2008; 37 pgs.
Soldani, David et al.; Title: Wireless Relays for Broadband Access; IEEE Communications Magazine; Mar. 2008; pp. 58-66.
Pabst, Ralf et al.; Title: Relay-Based Deployment Concepts for Wireless and Mobile Broadband Radio; IEEE Communications Magazine; Sep. 2004; pp. 80-89.
Yu, Yi, et al.; U.S. Appl. No. 12/722,409, filed Mar. 11, 2010; Title: Relay Link Control Channel Design.
Yu, Yi, et al.; U.S. Appl. No. 12/722,412, filed Mar. 11, 2010; Title: Relay Reception Synchronization System and Method.
Office Action dated Mar. 19, 2012; U.S. Appl. No. 12/722,409, filed Mar. 11, 2012; 23 pages.
Office Action dated Apr. 4, 2012; U.S. Appl. No. 12/722,412, filed Mar. 11, 2010; 23 pages.

(56) References Cited

OTHER PUBLICATIONS

Final Office Action dated Jul. 18, 2012; U.S. Appl. No. 12/722,409, filed Mar. 11, 2012; 17 pages.
Final Office Action dated Aug. 31, 2012; U.S. Appl. No. 12/722,412, filed Mar. 11, 2010; 16 pages.
European Examination Report; Application No. 10709630.7; Jun. 28, 2012; 6 pages.
European Examination Report; Application No. 10709632.3; Jun. 28, 2012; 7 pages.
Advisory Action dated Nov. 6, 2012; U.S. Appl. No. 12/722,412, filed Mar. 11, 2010; 3 pages.
Korean Office Action; Application No. 10-2011-7024107; Oct. 29, 2012; 7 pages.
Mexican Office Action; Application No. MX/a/2011/009585; Oct. 11, 2012; 7 pages.
European Examination Report; Application No. 10709632.3; Dec. 4, 2012; 4 pages.
3GPP TSG RAN WG1 Meeting #55bis; "Consideration on Resource Allocation for Relay Backhaul Link"; R1-090222; Ljubljana, Slovenia; Jan. 12-16, 2009; 5 pages.
TSG-RAN1 #55bis; "Control Channel and Data Channel Design for Relay Link in LTE-Advanced"; R1-090153; Ljubljana, Slovenia; Jan. 12-16, 2009; 17 pages.
3GPP RAN WG1 #55; "Support of Rel-8 Ues by LTE-A Relays"; R1-084384; Prague, Czech Republic; Nov. 10-14, 2008; 20 pages.
Office Action dated May 13, 2013; U.S. Appl. No. 12/722,409, filed Mar. 11, 2010; 37 pages.
Japanese Office Action; Application No. 2011-554212; Feb. 21, 2013; 9 pages.
Korean Office Action; Application No. 10-2011-7024107; Apr. 30, 2013; 6 pages.
Australian Office Action; Application No. 2010224034; Apr. 18, 2013; 3 pages.
Mexican Office Action; Application No. MX/a/2011/009400; Mar. 14, 2013; 7 pages.
European Examination Report; Application No. 10709632.3; Apr. 22, 2013; 5 pages.
Japanese Office Action; Application No. 2011-554214; Apr. 9, 2013; 6 pages.
Final Office Action dated Aug. 21, 2013; U.S. Appl. No. 12/722,409, filed Mar. 11, 2010; 44 pages.
Canadian Office Action; Application No. 2,755,223; Jul. 26, 2013; 2 pages.
Chinese Office Action; Application No. 201080020736.5; Sep. 24, 2013; 17 pages.
Chinese Office Action; Application No. 201080020724.2; Oct. 10, 2013; 13 pages.
Chinese Office Action; Application No. 201080020738.4; Oct. 9, 2013; 22 pages.
European Examination Report; Application No. 10709632.3; Oct. 4, 2013; 3 pages.
Japanese Office Action; Application No. 2011-554214; Aug. 21, 2013; 10 pages.
Notice of Allowance dated Apr. 25, 2014; U.S. Appl. No. 12/722,409, filed Mar. 11, 2010; 20 pages.
Chinese Office Action as Received in Co-pending Application No. 201080020736.5 on May 9, 2014; 6 pages. (No English translation available).
Chinese Office Action; Application No. 201080020724.2; Mar. 19, 2014; 7 pages.
Chinese Office Action as Received in Co-pending Application No. 201080020738.4 on Apr. 22, 2014; 13 pages. (No English translation available).
3GPP TSG RAN WG1 Meeting #56; "Consideration on Resource Allocation for Relay Backhual Link"; R1-090790; 5 pages.
Office Action dated Nov. 14, 2013; U.S. Appl. No. 12/722,409, filed Mar. 11, 2010; 32 pages.
Japanese Office Action; Application No. 2011-554213; Jan. 8, 2014; 11 pages.
Canadian Office Action; Application No. 2,755,148; Nov. 25, 2013; 3 pages.
Japanese Final Office Action dated Jan. 14, 2014 as received in co-pending Japanese Application No. 2011-554214; 2 pages. (No English Translation Available).
Notice of Allowance dated Jul. 30, 2014; U.S. Appl. No. 12/722,409, filed Mar. 11, 2010; 12 pages.
Office Action dated Jul. 15, 2014; U.S. Appl. No. 12/722,412, filed Mar. 11, 2010; 47 pages.
Japanese Final Office Action as Received in Co-pending Application No. 2011-554213 on Jun. 19, 2014; 3 pages. (No English translation available).
Chinese Office Action; Application No. 201080020738.4; Oct. 10, 2014; 7 pages.
Office Action dated May 21, 2015; U.S. Appl. No. 12/722,412, filed Mar. 11, 2010; 20 pages.
Advisory Action dated Mar. 12, 2015; U.S. Appl. No. 12/722,412, filed Mar. 11, 2010; 4 pages.
Canadian Office Action; Application No. 2,755,223; May 12, 2015; 3 pages.
Final Office Action dated Jan. 27, 2015; U.S. Appl. No. 12/722,412, filed Mar. 11, 2010; 25 pages.
Chinese Office Action; Application No. 201080020736.5; Nov. 15, 2014; 16 pages.
Final Office Action dated Oct. 14, 2015; U.S. Appl. No. 12/722,412, filed Mar. 11, 2010; 23 pages.

* cited by examiner

RESOURCE ASSIGNMENTS FOR RELAY SYSTEM AND METHOD

CROSS-REFERENCE TO RELATED APPLICATIONS

The present application claims priority to U.S. Provisional Patent Application No. 61/160,163, filed Mar. 13, 2009, by Yi Yu, et al., entitled "Resource Assignments for Relay System and Method"; U.S. Provisional Patent Application No. 61/160,156, filed Mar. 13, 2009, by Yi Yu, et al, entitled "Relay Link Control Channel Design"; and U.S. Provisional Patent Application No. 61/160,158, filed Mar. 13, 2009, by Yi Yu, et al, entitled "Relay Reception Synchronization System and Method"; and, all of which are incorporated by reference herein as if reproduced in its entirety.

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. An access node may comprise a plurality of hardware and software.

The term "access node" may not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may be used serially to extend or enhance coverage created by an access node.

An LTE system can include protocols such as a Radio Resource Control (RRC) protocol, which is responsible for the assignment, configuration, and release of radio resources between a UA and a network node or other LTE equipment. The RRC protocol is described in detail in the Third Generation Partnership Project (3GPP) Technical Specification (TS) 36.331. According to the RRC protocol, the two basic RRC modes for a UA are defined as "idle mode" and "connected mode." During the connected mode or state, the UA may exchange signals with the network and perform other related operations, while during the idle mode or state, the UA may shut down at least some of its connected mode operations. Idle and connected mode behaviors are described in detail in 3GPP TS 36.304 and TS 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
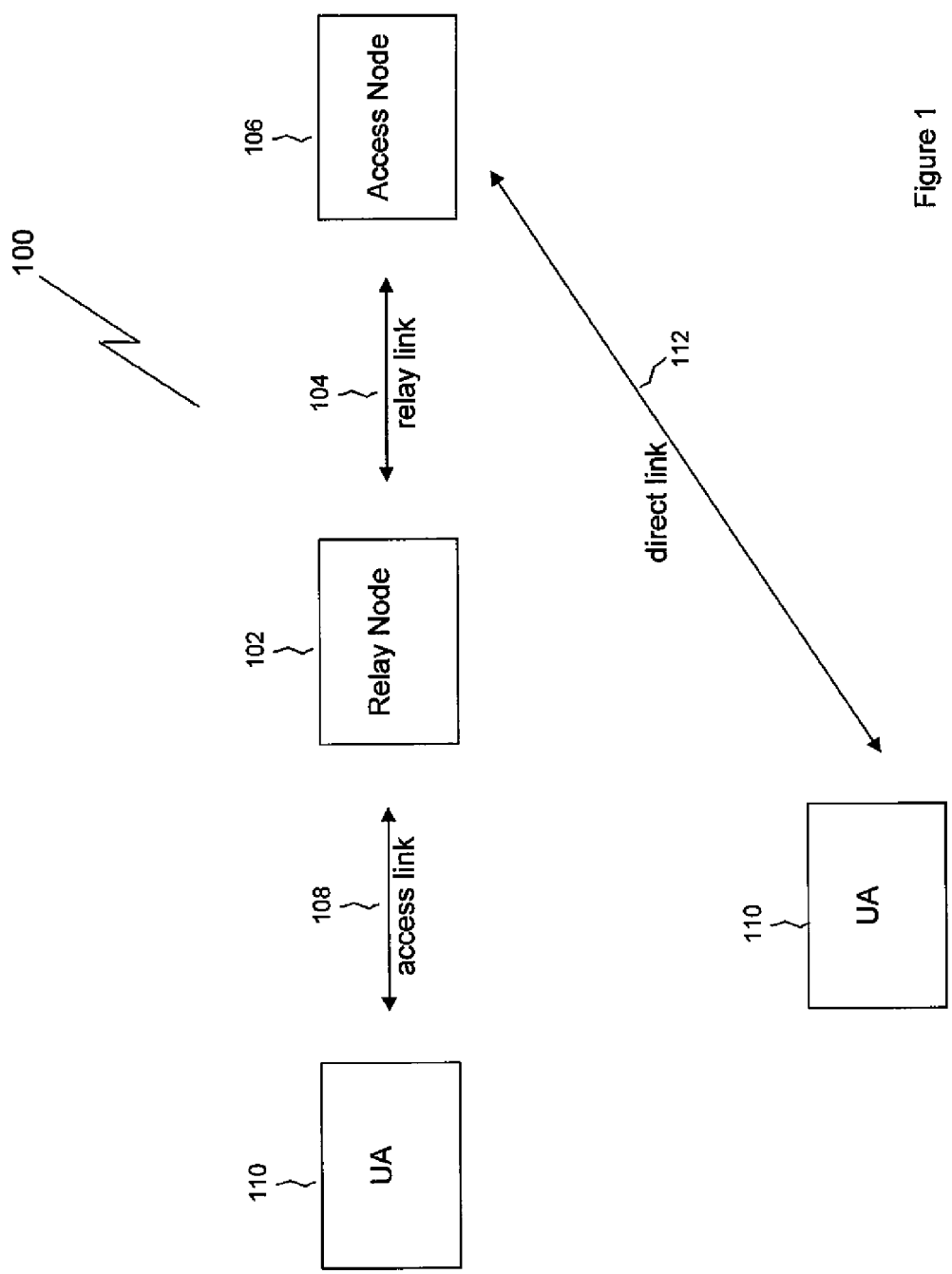
FIG. 1 is a diagram illustrating a wireless communication system that includes a relay node, according to an embodiment of the disclosure.

FIG. 1 is a diagram illustrating a wireless communication system 100 that includes a relay node 102, according to an embodiment of the disclosure. Examples of the wireless communication system 100 include LTE or LTE-Advanced (LTE-A) networks, and all of the disclosed and claimed embodiments could be implemented in an LTE-A network. The relay node 102 can amplify or repeat a signal received from a UA 110 and cause the modified signal to be received at an access node 106. In some implementations of a relay node 102, the relay node 102 receives a signal with data from the UA 110 and then generates a new signal to transmit the data to the access node 106. The relay node 102 can also receive data from the access node 106 and deliver the data to the UA 110.

The relay node 102 might be placed near the edges of a cell so that the UA 110 can communicate with the relay node 102 rather than communicating directly with the access node 106 for that cell. In radio systems, a cell is a geographical area of reception and transmission coverage. Cells can overlap with each other. In the typical example, there is one access node associated with each cell. The size of a cell is determined by factors such as frequency band, power level, and channel conditions. Relay nodes, such as relay node 102, can be used to enhance coverage within a cell or to extend the size of coverage of a cell. Additionally, the use of a relay node 102 can enhance throughput of a signal within a cell because the UA 110 can access the relay node 102 at a higher data rate than the UA 110 might use when communicating directly with the access node 106 for that cell, thus creating higher spectrum efficiency. The use of a relay node 102 can also decrease the UA's battery usage by allowing the UA 110 to transmit at a lower power.

Relay nodes can be divided into three types: layer one relay nodes, layer two relay nodes, and layer three relay nodes. A layer one relay node is essentially a repeater that can retransmit a transmission without any modification other than amplification and slight delay. A layer two relay node can decode a transmission that it receives, re-encode the result of the decoding, and then transmit the re-encoded data. A layer three relay node can have full radio resource control capabilities and can thus function similarly to an access node. The radio resource control protocols used by a relay node may be the same as those used by an access node, and the relay node may have a unique cell identity typically used by an access node. The illustrative embodiments are primarily concerned with layer two or layer three relay nodes. Therefore, as used herein, the term "relay node" will not refer to layer one relay nodes, unless specifically stated otherwise.

When the UA 110 is communicating with the access node 106 via the relay node 102, the links that allow wireless communication can be said to be of three distinct types. The communication link between the UA 110 and the relay node 102 is said to occur over an access link 108. The communication between the relay node 102 and the access node 106 is said to occur over a relay link 104. Communication that passes directly between the UA 110 and the access node 106 without passing through the relay node 102 is said to occur over a direct link 112.

The access node 106 sends data to the relay node 102 in a series of subframes, each of which consists of a relatively shorter control region followed by a relatively longer data region. The control region, or physical downlink control channel (PDCCH), typically consists of one to four orthogonal frequency-division multiplexing (OFDM) symbols. The data region, or physical downlink shared channel (PDSCH), can be considerably longer. The relay node 102 sends data to the UA 110 in a similar format.

Figure 2A:
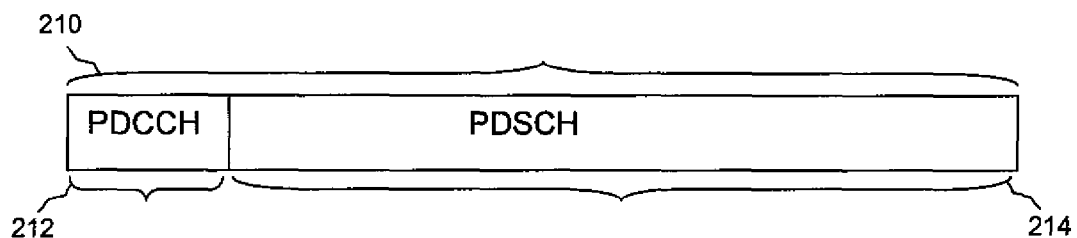
FIG. 2a is a diagram of a standard subframe of data.
Figure 2B:
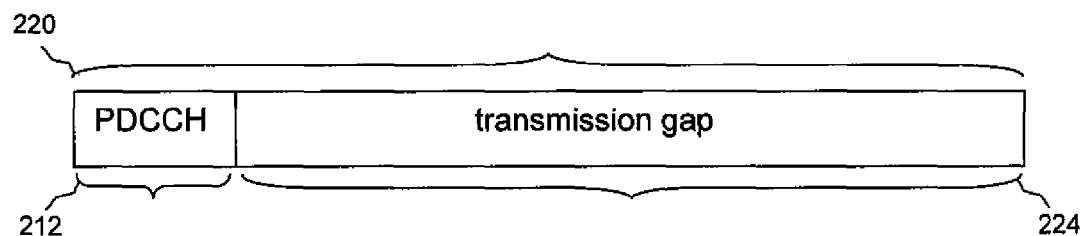
FIG. 2b is a diagram of an MBSFN subframe of data.

Some of the subframes that the relay node 102 sends to the UA 110 contain data only in the PDCCH region and not in the PDSCH region. For historical reasons, such subframes are known as Multicast/Broadcast Single Frequency Network (MBSFN) subframes. FIGS. 2a and 2b illustrate a standard subframe 210 and an MBSFN subframe 220, respectively. The standard subframe 210 consists of a PDCCH region 212 that contains control information and a PDSCH region 214 that contains the actual data that is to be transmitted. The MBSFN subframe 220 also includes the PDCCH region 212, but the remainder of the MBSFN subframe 220 consists of a transmission gap 224 rather than PDSCH data.

When the relay node 102 sends a standard subframe 210 to the UA 110, the relay node 102 typically transmits data throughout the duration of the subframe 210. For an MBSFN subframe 220, the relay node 102 transmits data only for the duration of the PDCCH region 212 and then disables its transmitter for the duration of the transmission gap 224. For various technical and expense reasons, the relay node 102 typically cannot transmit and receive data at the same time. Therefore, the relay node 102 can typically receive data from the access node 106 only after the relay node 102 has completed transmitting PDCCH data and has disabled its transmitter. That is, the relay node 102 receives data only during the transmission gap portion 224 of an MBSFN subframe 220.

Among the data that the relay node 102 might need to receive from the access node 106 is an uplink grant informing the relay node 102 of a resource that the relay node 102 can use to transmit data to the access node 106. When the relay node 102 wishes to send data to the access node 106, the relay node 102 can send a resource request to the access node 106. The access node 106 can then, in a downlink transmission to the relay node 102, allocate a resource to the relay node 102 that the relay node 102 can use to send its data to the access node 106. That is, the access node 106 might grant the relay node 102 the use of a communication channel with a specific set of frequency parameters and other characteristics that the relay node 102 can use on an uplink to the access node 106.

Since the relay node 102 can receive data from the access node 106 only when the relay node 102 is not transmitting, the relay node 102 may be able to receive the uplink grant from the access node 106 only in an MBSFN subframe 220. MBSFN subframes might comprise only a small portion of the data that the access node 106 sends to the relay node 102. Therefore, the access node 106 has only limited opportunities to allocate uplink resources to the relay node 102.

In an embodiment, in a single downlink transmission to a relay node 102, an access node 106 grants a plurality of uplink resources to be used by the relay node 102 in a plurality of future subframes. The access node 106 specifies the resources (for example, the frequencies) that the relay node 102 should use for each of the uplinks as well as the timing for the uplinks (that is, the subframes in which the relay node 102 should transmit to the access node 106). This can allow the access node 106 to take fuller advantage of its limited opportunities to allocate uplink resources to the relay node 102.

This embodiment can be contrasted with current procedures by which an access node 106 can allocate uplink resources to a UA 110 when a relay node 102 is not present. In one procedure, the UA 110 might request an uplink resource, and the access node 106 might allocate a single resource based on the request. The UA 110 can then transmit data to the access node 106 using the allocated uplink resource. When the UA 110 needs another resource, the UA 110 makes another resource request and receives another resource grant.

Figure 3A:
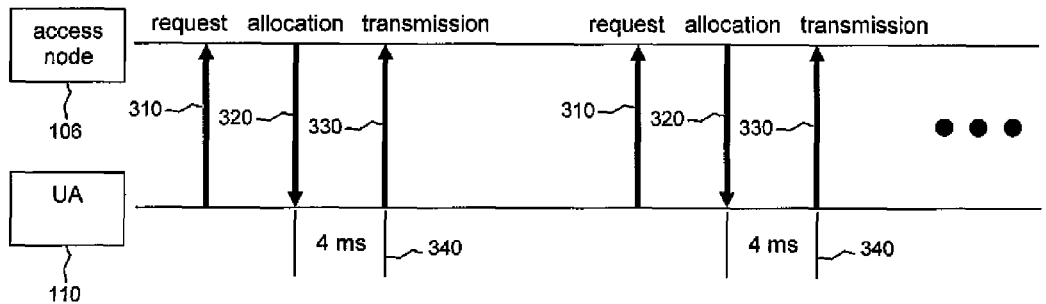
FIG. 3a is a diagram of a procedure for allocating uplink resources to a user agent according to the prior art.

This is illustrated in FIG. 3a, where the UA 110 sends a request 310 for resources to the access node 106. The access node 106 then sends the UA 110 an allocation 320 of an uplink resource. The UA 110 then sends the access node 106 a transmission 330 of data on the allocated uplink resource. The length of time 340 between the allocation 320 of the resource and the transmission 330 on the uplink is fixed. In this case, the UA 110 transmits to the access node 106 four milliseconds after receiving a resource grant. This sequence of a request 310 on the uplink, an allocation 320 on the downlink, and a transmission 330 of data on the uplink at fixed time after the allocation 320 can be repeated each time the UA 110 needs to transmit data on the uplink.

In another procedure, a technique known as semi-persistent scheduling (SPS) can be used. With SPS, the UA 110 makes a single resource request. The access node 106 then allocates a fixed set of uplink resources to the UA 110 based on the single request. The UA 110 then uses the fixed resources to send data to the access node 106 on a periodic basis. The UA 110 does not need to make any further resource requests.

Figure 3B:
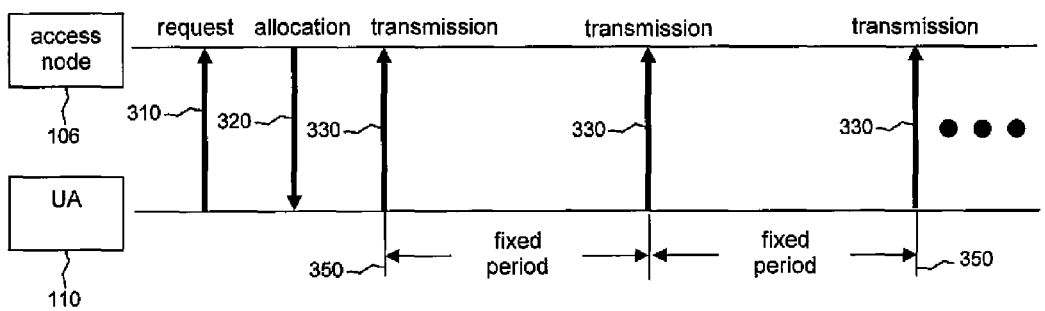
FIG. 3b is a diagram of an alternative procedure for allocating uplink resources to a user agent according to the prior art.

This is illustrated in FIG. 3b, where the UA 110 sends a singe resource request 310 to the access node 106. The access node 106 then sends the UA 110 an allocation 320 of a fixed set of periodic uplink resources. The UA 110 sends the access node 106 a transmission 330 of data on the first of the periodic uplink resources. After a fixed period 350 of time, the UA 110 uses an uplink resource with the same characteristics as the previously allocated resource to transmit to the access node 106. After another fixed period 350 of time, the UA 110 makes another transmission 330 on the next fixed periodic resource. The periodic transmissions 330 might continue to be repeated indefinitely.

In the first of these procedures, whenever a resource allocation to the UA 110 occurs, only a single resource is granted, and the grant applies to only one future subframe. The time when the allocated resource is to be used for an uplink transmission cannot be specified, but is instead fixed at a certain period of time after the allocation. In the second of these procedures, resource allocation signaling on the downlink occurs only one time, but the resource availability is periodic, and the same resource is used each time.

By contrast, in the present embodiments, a multi-subframe allocation occurs. That is, in a single allocation of resources to the relay node 102, resource information is provided for multiple future subframes. The times when the uplinks associated with each of the allocations are to occur are specified and are not necessarily periodic. A different resource could be allocated for each subframe. Resources might be provided, for example, for multiple consecutive future subframes, for multiple non-consecutive but periodic future subframes, or for multiple non-consecutive, non-periodic future subframes.

Figure 3C:
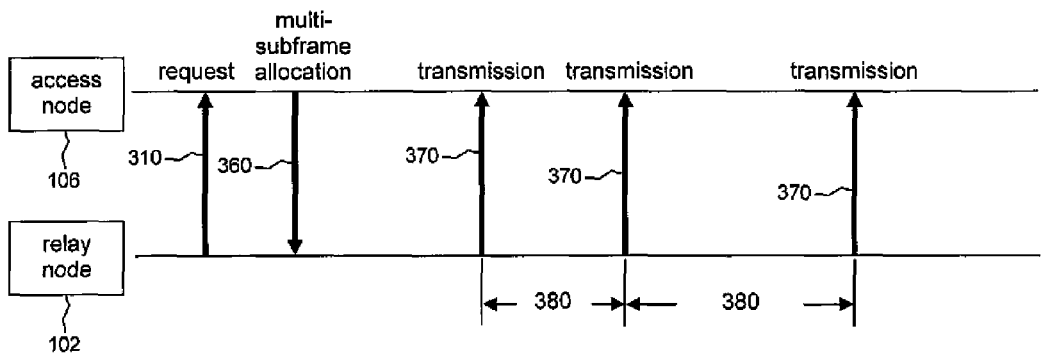
FIG. 3c is a diagram of a procedure for allocating uplink resources to a relay node according to an embodiment of the disclosure.

An embodiment of resource allocation in this manner is illustrated in FIG. 3c, where the relay node 102 sends a request 310 for resources to the access node 106. The access node 106 then sends the relay node 102 a multi-subframe allocation 360 of uplink resources. Each allocation in the multi-subframe allocation 360 specifies a resource that the relay node 102 can use and a time when the relay node 102 can use that resource. The resources can be different from one another, and the times are not necessarily periodic. The relay node 102 can then send the access node 106 a transmission 370 of uplink data on each of the disparate resources at each of the specified times. In this example, three uplink transmissions 370 occur, but in other cases, other numbers of uplink resources could have been allocated. There need not be any regularity or periodicity in the lengths of time 380 between the transmissions 370, but such regularity can be provided, if desired.

While this embodiment has applied to multi-subframe uplink resource allocations from an access node to a relay node, similar considerations could apply to allocations from an access node to a UA.

Figure 4:
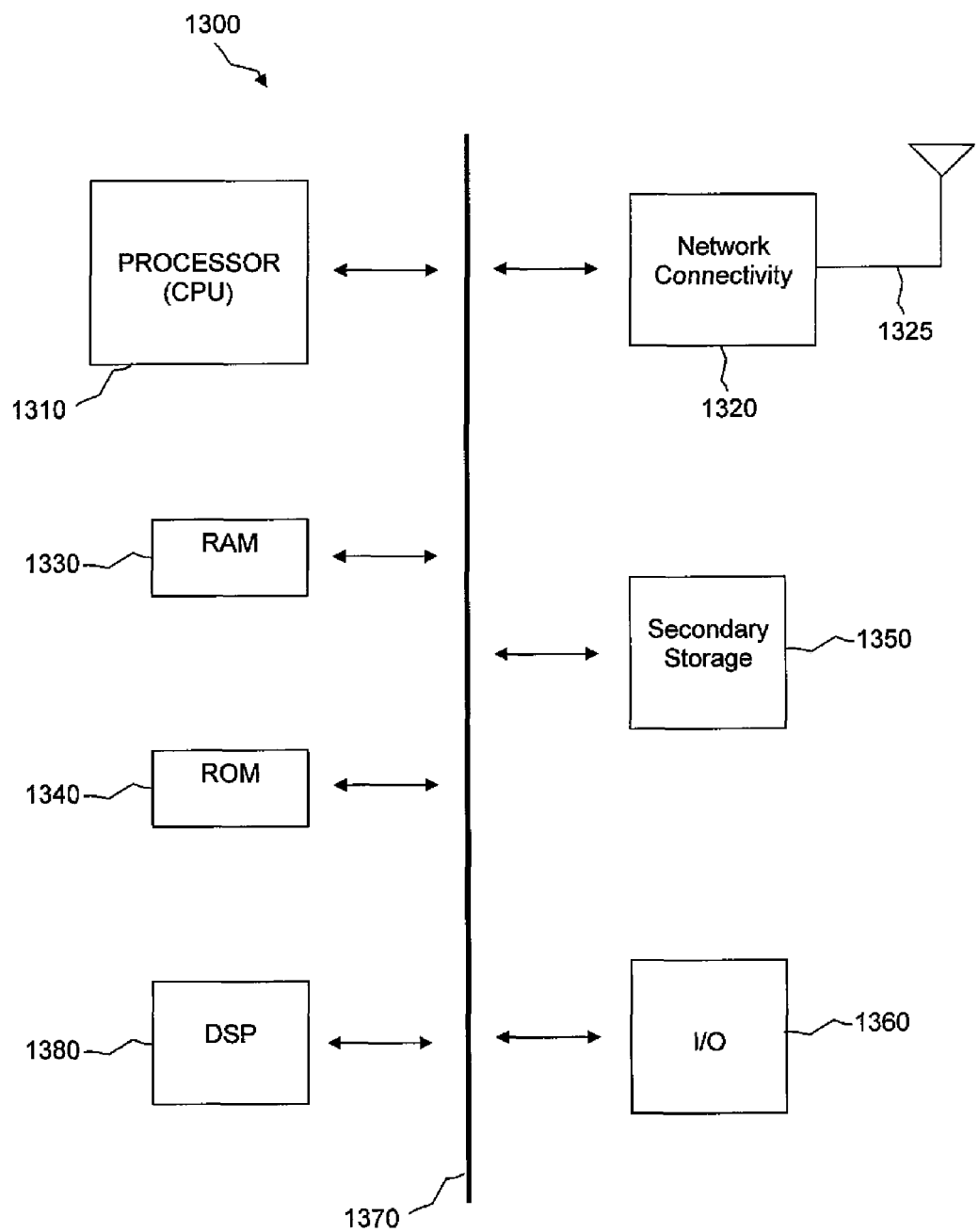
FIG. 4 illustrates a processor and related components suitable for implementing the several embodiments of the present disclosure.

The UA 110 and other components described above might include a processing component that is capable of executing instructions related to the actions described above. FIG. 4 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an embodiment, a method is provided for allocating uplink resources to a relay node. The method includes an access node allocating a plurality of disparate uplink resources to the relay node in a single downlink transmission to the relay node.

In another embodiment, an access node in a wireless telecommunications system is provided. The access node includes a processor configured such that the access node informs a relay node of a plurality of disparate uplink resources available for use by the relay node.

In another embodiment, a relay node in a wireless telecommunications system is provided. The relay node includes a processor configured such that the relay node receives from an access node information related to a plurality of disparate uplink resources that the relay node can use to transmit data to the access node.

In another embodiment, a method is provided for allocating uplink resources to a relay node. The method includes an access node allocating a plurality of uplink resources to the relay node in a single downlink transmission to the relay node, wherein the uplink resources are made available on non-periodic basis.

In another embodiment, an access node in a wireless telecommunications system is provided. The access node includes a processor configured such that the access node informs a relay node of a plurality of uplink resources available for use by the relay node, wherein the access node specifies a plurality of non-periodic times at which the relay node can use the plurality of uplink resources.

In another embodiment, a relay node in a wireless telecommunications system is provided. The relay node includes a processor configured such that the relay node receives from an access node information related to a plurality of uplink resources that the relay node can use to transmit data to the access node. The processor is further configured such that the relay node receives information related to a plurality of non-periodic times at which the relay node can transmit data to the access node on the uplink resources. The processor is further configured such that the relay node transmits the data at the times.

The following are incorporated herein by reference for all purposes: 3rd Generation Partnership Project (3GPP) Technical Specification (TS) 36.813 and 3GPP TS 36.814.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for allocating uplink resources to a user agent (UA), comprising:
    an access node allocating a disparate set of uplink resources to be used by the UA to transmit data to the access node at different times, wherein the access node allocates the disparate set of uplink resources in response to receiving only a single resource request from the UA,
    wherein the access node specifies a plurality of different non-periodic subframes in which the UA is to use each of the respective uplink resources,
    wherein the disparate set of uplink resources are located in different frequencies within the plurality of different non-periodic subframes.

2. The method of claim 1, wherein the uplink resources are to be used by the UA for an indefinite duration.

3. An access node in a wireless telecommunications system, comprising:
    a transceiver configured to receive a resource request;
    a processor configured such that in response to receiving only a single resource request, the access node allocates a disparate set of uplink resources to a user agent (UA), wherein the disparate set of uplink resources are made available for use by the UA for uplink transmissions occurring at different times,
    wherein the access node specifies a plurality of different non-periodic subframes in which the UA is to use each of the respective uplink resources,
    wherein the disparate set of uplink resources located in different frequencies within the plurality of different non-periodic subframes.

4. The access node of claim 3, wherein the access node allocates the disparate set of uplink resources for the UA to use for an indefinite duration.

5. A user agent (UA) in a wireless telecommunications system, comprising:
    a transceiver sending a resource request;
    a processor configured such that in response to sending only a single resource request, the UA receives from an access node a disparate set of uplink resources that the UA can use at different times to transmit data to the access node,
    wherein the UA is configured to receive an indication from the access node that specifies a plurality of different non-periodic subframes in which the UA is to use each of the respective uplink resources,
    wherein the disparate set of uplink resources are located in different frequencies within the plurality of different non-periodic subframes.

6. The UA of claim 5, wherein the processor is configured to use the uplink resources for an indefinite duration.

7. A method for allocating uplink resources to a user agent (UA), comprising:
an access node allocating a disparate set of uplink resources to the UA in response to receiving only a single resource request from the UA, wherein the disparate set of uplink resources are located in different frequencies within a plurality of different non-periodic subframes,
wherein the access node specifies the plurality of different non-periodic subframes in which the UA is to use each of the respective uplink resources.

8. The method of claim 7, wherein the uplink resources are different than one another.

9. The method of claim 7, wherein the uplink resources are to be used for an indefinite duration.

10. An access node in a wireless telecommunications system, comprising:
a transceiver configured to receive a resource request;
a processor configured such that in response to receiving only a single resource request from a user agent (UA), the access node allocates a disparate set of uplink resources available for use by the UA, wherein the disparate set of uplink resources are located in different frequencies within a plurality of different non-periodic subframes,
wherein the access node specifies the plurality of different non-periodic subframes in which the UA is to use each of the respective uplink resources.

11. The access node of claim 10, wherein the uplink resources are different than one another.

12. The access node of claim 10, wherein the access node allocates the disparate set of uplink resources for the UA to use for an indefinite duration.

13. A user agent (UA) in a wireless telecommunications system, comprising:
a transceiver sending a resource request;
a processor configured such that in response to sending only a single resource request, the UA receives from an access node a disparate set of uplink resources that the UA can use to transmit data to the access node, wherein the disparate set of uplink resources are located in different frequencies within a plurality of different non-periodic subframes,
wherein the UA is configured to receive an indication from the access node that specifies the plurality of different non-periodic subframes in which the UA is to use each of the respective uplink resources.

14. The UA of claim 13, wherein the uplink resources are different than one another.

15. The UA of claim 13, wherein the UA uses the disparate set of uplink resources for an indefinite duration.

16. The method of claim 1, wherein the access node specifies to the UA a plurality of different frequencies for using each of the uplink resources in the plurality of different subframes, respectively.

17. The access node of claim 3, wherein the access node specifies to the UA a plurality of different frequencies for using each of the uplink resources in the plurality of different subframes, respectively.

18. The user agent of claim 5, wherein the indication from the access node further specifies a plurality of different frequencies for using each of the uplink resources in the plurality of different subframes, respectively.

19. The method node of claim 7, wherein the access node specifies to the UA a plurality of different frequencies for using each of the uplink resources in the plurality of different subframes, respectively.

20. The access node of claim 10, wherein the access node specifies to the UA a plurality of different frequencies for using each of the uplink resources in the plurality of different subframes, respectively.

21. The user agent of claim 13, wherein the indication from the access node further specifies a plurality of different times for using each of the uplink resources in the plurality of different subframes, respectively.

* * * * *

UNITED STATES PATENT AND TRADEMARK OFFICE
CERTIFICATE OF CORRECTION

PATENT NO. : 9,232,512 B2
APPLICATION NO. : 12/722417
DATED : January 5, 2016
INVENTOR(S) : Yi Yu et al.

It is certified that error appears in the above-identified patent and that said Letters Patent is hereby corrected as shown below:

Claims

Claim 3, Column 8, Line 45 replace "resources located" with --resources are located--

Claim 19, Column 10, Line 26 replace "method node" with --method--

Signed and Sealed this
Twelfth Day of April, 2016

Michelle K. Lee
*Director of the United States Patent and Trademark Office*